(12) United States Patent
Kalo et al.

(10) Patent No.: US 12,199,272 B2
(45) Date of Patent: Jan. 14, 2025

(54) PROCESS FOR MAKING A COATED ELECTRODE ACTIVE MATERIAL

(71) Applicant: BASF SE, Ludwigshafen am Rhein (DE)

(72) Inventors: Benedikt Kalo, Battle Creek, MI (US); Dominik Garella, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 100 days.

(21) Appl. No.: 17/595,395

(22) PCT Filed: Jun. 10, 2020

(86) PCT No.: PCT/EP2020/066098
§ 371 (c)(1),
(2) Date: Nov. 16, 2021

(87) PCT Pub. No.: WO2020/260022
PCT Pub. Date: Dec. 30, 2020

(65) Prior Publication Data
US 2022/0223842 A1    Jul. 14, 2022

(30) Foreign Application Priority Data
Jun. 25, 2019  (EP) .................................... 19182242

(51) Int. Cl.
H01M 4/36      (2006.01)
H01M 4/505     (2010.01)
H01M 4/525     (2010.01)
H01M 4/62      (2006.01)
H01M 4/02      (2006.01)

(52) U.S. Cl.
CPC ........... H01M 4/366 (2013.01); H01M 4/505 (2013.01); H01M 4/525 (2013.01); H01M 4/62 (2013.01); H01M 2004/028 (2013.01)

(58) Field of Classification Search
CPC .................................................. H01M 4/366
See application file for complete search history.

(56) References Cited

U.S. PATENT DOCUMENTS

| 8,993,051 B2 | 3/2015 | Kelder et al. |
| 2014/0079873 A1* | 3/2014 | Miki ................... H01M 4/0402 427/58 |
| 2017/0253494 A1* | 9/2017 | Garella ................. C01G 51/00 |

FOREIGN PATENT DOCUMENTS

| EP | 3412633 A1 | 12/2018 |
| WO | WO 2018/162232 | * 9/2018 |
| WO | WO 2018/162232 A1 | 9/2018 |
| WO | WO 2018/215254 A1 | 11/2018 |
| WO | WO-2020/052995 A1 | 3/2020 |
| WO | WO-2020/052997 A1 | 3/2020 |

OTHER PUBLICATIONS

Cocco et al. "Introduction to Fluidization" (2014).*
International Search Report dated Jul. 8, 2020, PCT/EP2020/066098.
European Search Report for EP Patent Application No. 19182242.8, Issued on Mar. 27, 2020, 3 pages.

* cited by examiner

Primary Examiner — Austin Murata
(74) Attorney, Agent, or Firm — Armstrong Teasdale LLP

(57) ABSTRACT

Process for making a coated electrode active material wherein said process comprises the following steps: (a) providing a particulate electrode active material according to general formula $Li_{1+x}TM_{1-x}O_2$, wherein TM is a combination of Ni, Co and, optionally, Mn, and, optionally, at least one metal selected from Mg, Al, Ba, Ti and Zr, and x is in the range of from zero to 0.2, wherein at least 15 mole-% of the transition metal of TM is Ni, (b) treating said electrode active material with a compound of $M^1$, wherein $M^1$ is selected from Li, Al, B, Mg, Si, Sn, and from transition metals, or a combination of at least two of the foregoing, with or without a solvent, wherein said compound of $M^1$ does not act as a cathode active material on its own, (c) optionally, removing compound of $M^1$ which is not deposited on said particulate electrode active material, (d) performing a post-treatment by heating the material obtained after the step (b) or (c), if applicable, at a temperature from 250 to 950° C. in a fluidized bed.

9 Claims, No Drawings

PROCESS FOR MAKING A COATED ELECTRODE ACTIVE MATERIAL

This application is a national stage filing under 35 U.S.C. § 371 of International Application No. PCT/EP2020/066098, filed on Jun. 10, 2020, which claims the benefit of priority to European Application No. 19182242.8, filed Jun. 25, 2019; the disclosure of each of these applications are each incorporated herein by reference in their entirety.

The present invention is directed towards a process for making a coated electrode active material wherein said process comprises the following steps:

(a) providing a particulate electrode active material according to general formula $Li_{1+x}TM_{1-x}O_2$, wherein TM is a combination of Ni, Co and, optionally, Mn, and, optionally, at least one metal selected from Mg, Ba, Al, Ti and Zr, and x is in the range of from zero to 0.2, wherein at least 15 mole-% of the transition metal of TM is Ni, (b) treating said electrode active material with a compound of $M^1$, wherein $M^1$ is selected from Li, Al, B, Mg, Si, Sn, and from transition metals, or a combination of at least two of the foregoing, with or without a solvent, wherein said compound of $M^1$ does not act as a cathode active material on its own, (c) optionally, removing compound of $M^1$ which is not deposited on said particulate electrode active material, (d) performing a post-treatment by heating the material obtained after the step (b) or (c), if applicable, at a temperature from 250 to 950° C. in a fluidized bed.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

One problem of lithium ion batteries lies in undesired reactions on the surface of the cathode active materials. Such reactions may be a decomposition of the electrolyte or the solvent or both. It has thus been tried to protect the surface without hindering the lithium exchange during charging and discharging. Examples are attempts to coat the cathode active materials with, e.g., aluminium oxide or calcium oxide, see, e.g., U.S. Pat. No. 8,993,051.

The efficiency of the process to protect the manufacture of such protected cathode active material, however, may still be improved.

It was therefore an objective of the present invention to provide a process by which particulate electrode active material may be manufactured that have a sufficient stability against undesired reactions on the surface. Such process improvement should be easy to perform and lead to a uniform product.

Accordingly, the process as defined at the outset has been found, hereinafter also referred to as inventive process or as process according to the (present) invention. The inventive process is a process for making a coated electrode active material.

In one embodiment of the present invention the particulate material electrode active material has an average particle diameter (D50) in the range of from 2 to 20 µm, preferably from 3 to 16 µm. The average particle diameter can be determined, e. g., by light scattering or LASER diffraction or electroacoustic spectroscopy. The particles are usually composed of agglomerates from primary particles, and the above particle diameter refers to the secondary particle diameter.

The term "coated" as used in the context with the present invention refers to at least 80% of the particles of a batch of particulate material being coated, and to at least 75% of the surface of each particle being coated, for example 75 to 99.99% and preferably 80 to 95%.

The thickness of such coating may be very low, for example 0.1 nm to 2 µm. In some embodiments, the thickness may be in the range of from 6 to 150 nm. In further embodiments, the thickness of such coating is in the range of from 16 to 50 nm. The thickness in this context refers to an average thickness determined mathematically by calculating the amount of compound of $M^1$ per particle surface in $m^2$ and assuming a 100% conversion.

Preferably, the average thickness of a coating amounts to a maximum of 10% of the average diameter (D50) of such particulate material electrode active material.

The inventive process comprises steps (a), (b), (c) and (d), in the context of the present invention also referred to as step (a), step (b), step (c) and step (d), respectively.

Step (a) includes providing a particulate electrode active material according to general formula $Li_{1+x}TM_{1-x}O_2$, wherein TM is a combination of Ni, Co and, optionally, Mn, and, optionally, at least one metal selected from Mg, Al, Ba, Ti and Zr, and x is in the range of from zero to 0.2, wherein at least 15 mole-%, preferably at least 33 mole-% of the transition metal of TM is Ni, even more preferably at least 50 mole-%. Said electrode active material is selected from lithiated nickel-cobalt aluminum oxides, and lithiated cobalt-manganese oxide.

In one embodiment of the present invention, the particulate electrode active material has a specific surface ("BET surface") in the range of from 0.1 to 10 $m^2/g$, preferably from 0.1 to 1.5 $m^2/g$. The BET surface may be determined by nitrogen adsorption after outgassing of the sample at 200° C. for 30 minutes or more and beyond this accordance with DIN ISO 9277:2010.

Examples of layered nickel-cobalt-manganese oxides are compounds according to general formula (I)

$$(Ni_aCo_bMn_c)_{1-d}M_d \qquad (I)$$

with a being in the range of from 0.6 to 0.95,
b being in the range of from 0.025 to 0.2,
c being in the range of from 0.025 to 0.2, and
d being in the range of from zero to 0.2,
M is Mg, Al, Ba, W, Ti or Zr or a combination of at least two of the foregoing, and a+b+c=1.

Examples of preferred lithiated nickel-cobalt aluminum oxides are compounds of the general formula $Li[Ni_hCo_iAl_j]O_{2+r}$. Typical values for r, h, i and j are:

h is in the range of from 0.75 to 0.95,
i is in the range of from 0.04 to 0.20,
j is in the range of from 0.01 to 0.05, and
r is in the range of from zero to 0.4.

Particularly preferred are $Li_{(1+x)}[Ni_{0.2}Co_{0.1}Mn_{0.7}]_{(1-x)}O_2$, $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O_2$, and $Li_{(1+x)}[Ni_{0.8}Co_{0.1}Mn_{0.1}]_{(1-x)}O_2$, $Li_{(1+x)}[Ni_{0.85}Co_{0.1}Mn_{0.05}]_{(1-x)}O_2$, each with x as defined above, and $Li[Ni_{0.9}Co_{05}Al_{0.05}]O_2$.

Said particulate electrode active material is preferably provided without any additive such as conductive carbon or binder.

In step (a), particulate electrode active material may be provided as free-flowing powder or as slurry in an organic solvent or in water. Free-flowing powders are preferred.

In one embodiment of the present invention, the electrode active material provided in step (a) is used without further preparatory steps. In another embodiment of the present invention, a preparatory step (p) is performed before subjecting said electrode active material to step (b).

In the optional step (p), said particulate material is treated with an aqueous medium. Said aqueous medium may have a pH value in the range of from 2 up to 14, preferably at least 5, more preferably from 7 to 12.5 and even more preferably from 8 to 12.5. The pH value is measured at the beginning of step (p). It is observed that in the course of step (p), the pH value raises to at least 10.

It is preferred that the water hardness of aqueous medium and in particular of the water used for step (p) is at least partially removed, especially calcium. The use of desalinized water is preferred.

In one embodiment of the present invention, step (p) is performed by slurrying the particulate material from calcination in water followed by removal of the water by a solid-liquid separation method and drying at a maximum temperature in the range of from 50 to 450° C.

In an alternative embodiment of step (p), the aqueous medium used in step (p) may contain ammonia or at least one transition metal salt, for example a nickel salt or a cobalt salt. Such transition metal salts preferably bear counterions that are not detrimental to an electrode active material. Sulfate and nitrate are feasible. Chloride is not preferred.

In one embodiment of the present invention, step (p) is performed at a temperature in the range of from 5 to 85° C., preferred are 10 to 60° C.

In one embodiment of the present invention, step (p) is performed at normal pressure. It is preferred, though, to perform step (p) under elevated pressure, for example at 10 mbar to 10 bar above normal pressure, or with suction, for example 50 to 250 mbar below normal pressure, preferably 100 to 200 mbar below normal pressure.

Step (p) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, the volume ratio of starting material and total aqueous medium in step (p) is in the range of from 2:1 to 1:5, preferably from 2:1 to 1:2.

Step (p) may be supported by mixing operations, for example shaking or in particular by stirring or shearing, see below.

In one embodiment of the present invention, step (p) has a duration in the range of from 1 minute to 30 minutes, preferably 1 minute to less than 5 minutes. A duration of 5 minutes or more is possible in embodiments wherein in step (p), water treatment and water removal are performed overlapping or simultaneously.

In one embodiment of step (p), water treatment and water removal are performed consecutively. After the treatment with an aqueous medium in accordance to step (p), water may be removed by any type of filtration, for example on a band filter or in a filter press.

In one embodiment of the present invention, at the latest 3 minutes after commencement of step (p), water removal is started. Water removal includes removing said aqueous medium from treated particulate material by way of a solid-liquid separation, for example by decanting or preferably by filtration.

In one embodiment of the present invention, the slurry obtained in step (p) is discharged directly into a centrifuge, for example a decanter centrifuge or a filter centrifuge, or on a filter device, for example a suction filter or in a belt filter that is located preferably directly below the vessel in which step (p) is performed. Then, filtration is commenced.

In a particularly preferred embodiment of the present invention, step (p) is performed in a filter device with stirrer, for example a pressure filter with stirrer or a suction filter with stirrer. At most 3 minutes after—or even immediately after—having combined starting material and aqueous medium in accordance with step (p), removal of aqueous medium is commenced by starting the filtration. On laboratory scale, steps (p) may be performed on a Bchner funnel, and step (p) may be supported by manual stirring.

In a preferred embodiment, step (p) is performed in a filter device, for example a stirred filter device that allows stirring of the slurry in the filter or of the filter cake. By commencement of the filtration, for example pressure filtration or suction filtration, after a maximum time of 3 minutes after commencement of step (p), water removal is started.

In one embodiment of the present invention, the water removal has a duration in the range of from 1 minute to 1 hour.

In one embodiment of the present invention, stirring in step (p) is performed with a rate in the range of from 1 to 50 revolutions per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, step (p) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (p) under an atmosphere with a carbon dioxide content below detection limit for example with infrared light based optical methods.

Step (b) includes treating said electrode active material with a compound of $M^1$, wherein $M^1$ is selected from Al, B, Mg, and from transition metals, or a combination of at least two of the foregoing, with or without a solvent. Such treatment may be performed in one step or in one or more sub-steps, for example by coating, deposition or impregnation, especially mechanical solid coating, or by chemical vapor deposition or by atomic layer deposition ("ALD") or by impregnation methods.

Step (b) and the optional step (c) of the inventive process are performed in a mixer or a vessel or a cascade of at least two vessels, said mixer or vessel or cascade—if applicable—also being referred to as reactor in the context of the present invention.

In one embodiment of the inventive process, step (b) is performed at a temperature in the range of from 15 to 1000° C., preferably 15 to 500° C., more preferably 20 to 350° C., and even more preferably 20 to 50° C. It is preferred to select a temperature in step (b) at which compound of $M^1$, as the case may be, is in the gas phase.

In one embodiment of the present invention, step (b) is carried out at normal pressure but step (b) may as well be carried out at reduced or elevated pressure. For example, step (b) may be carried out at a pressure in the range of from 5 mbar to 1 bar above normal pressure, preferably 10 to 150 mbar above normal pressure. In the context of the present invention, normal pressure is 1 atm or 1013 mbar. In other embodiments, step (b) may be carried out at a pressure in the range of from 150 mbar to 560 mbar above normal pressure. In other embodiments, step (b) is performed at reduced pressure, for example from 1 to 550 mbar.

In a preferred embodiment of the present invention, compounds of $M^1$ are selected from compounds of Al, Ti, B, Mg, Co, Y, Ta or Zr and combinations of at least two of the foregoing. Said compound of $M^1$ does not act as a cathode active material on its own. It is thus inactive with respect to electrode reactions but serves as lithium ion conductor.

In a preferred embodiment of the present invention, compounds of $M^1$ are selected from $LiOR^2$, LiOH, LiX, $M^2(R^1)_2$, $M^3(R^1)_3$, $M^4(R^1)_{4-y}H_y$, $M^2(OR^2)_2$, $M^2(OH)_2$, $M^3(OR^2)_3$, $M^3(OH)_3$, $M^3OOH$, $M^4(OR^2)_4$, $M^4[NR^2)_2]_4$, $M^2X_2$, $M^3X_3$, $M^4X_4$ and $M^5X_5$, and compounds of $M^1$ with combinations of counterions, for example $M^2(R^1)X$, $M^3(R^1)_2X$, $M^3R^1X_2$, $M^4(R^1)_3X$, $M^4(R^1)_2X_2$, $M^4R^1X_3$, and from methyl alumoxane, wherein the variables are defined as follows:

$R^1$ are different or equal and selected from $C_1$-$C_8$-alkyl, straight-chain or branched, $R^2$ are different or equal and selected from $C_1$-$C_4$-alkyl, straight-chain or branched, X are same or different and selected from acetate, formate, nitrate or halide, especially nitrate or chloride, wherein two ions of X may be replaced by sulfate or oxide, $M^2$ is selected from Mg and Zn and Co, $M^3$ is selected from Al, B, Y and Ti, $M^4$ is selected from Si, Sn, Ti, Zr, and Hf, with Sn and Ti being preferred, $M^5$ is selected from Nb and Ta, the variable y is selected from zero to 4, especially from zero and 1.

Examples of LiX are $LiNO_3$, LiOH and LiCl.

Examples of $M^2(R^1)_2$ are n-$C_4H_9$—Mg(n-octyl), $Zn(CH_3)_2$ and $Zn(C_2H_5)_2$. Examples of $M^2(OR^1)_2$ are $Zn(OCH_3)_2$, $Zn(OC_2H_5)_2$, $Mg(OCH_3)_2$ and $Mg(OC_2H_5)_2$.

Examples of $M^2X_2$, are $ZnCl_2$, $ZnSO_4$, ZnO, $Zn(NO_3)_2$, $MgCl_2$, $MgSO_4$, MgO, $Mg(NO_3)_2$, $CoCl_2$, CoO, $CoSO_4$, and $Co(NO_3)_2$.

Preferred examples of $M^3(OR^2)_3$ and $M^4(OR^2)_4$ are $Si(OCH_3)_4$, $Si(OC_2H_5)_4$, $Si(O-n-C_3H_7)_4$, $Si(O-iso-C_3H_7)_4$, $Si(O-n-C_4H_9)_4$, $Ti[OCH(CH_3)_2]_4$, $Ti(OC_4H_9)_4$, $Zn(OC_3H_7)_2$, $Zr(OC_4H_9)_4$, $Zr(OC_2H_5)_4$, $B(OCH_3)_3$, $B(OC_2H_5)_3$, $Al(OCH_3)_3$, $Al(OC_2H_5)_3$, $Al(O-n-C_3H_7)_3$, $Al(O-iso-C_3H_7)_3$, $Al(O-sec.-C_4H_9)_3$, and $Al(OC_2H_5)(O-sec.-C_4H_9)_2$.

Examples of aluminum alkyl compounds are trimethyl aluminum, triethyl aluminum, triisobutyl aluminum, and methyl alumoxane.

Metal amides are sometimes also referred to as metal imides. Examples of metal amides are $Ti[N(CH_3)_2]_4$ and $Zr[N(CH_3)_2]4$.

Examples of $M^3X_3$, $M^4X_4$ and $M^5X_5$ and of compounds of $M^1$ with combinations of counterions are $Al(NO_3)_3$, $AlONO_3$, $Al_2(SO_4)_3$, AlOOH, $Al_2O_3$, $Al(OH)_3$, $B_2O_3$, $B(OH)_3$, $TiCl_4$, $TiOCl_2$, $TiO(NO_3)_2$, $Ti(SO_4)_2$, $TiO_2$, TiO(OH)$_2$, $TiOSO_4$, $ZrCl_4$, $ZrOCl_2$, $ZrO_2$, $ZrO(OH)_2$, $Zr(SO_4)_2$, $ZrOSO_4$, $ZrO(NO_3)_2$, $HfO_2$, $Hf(OH)_2$, $HfCl_4$, $HfOCl_2$, $Hf(SO_4)_2$, $HfOSO_4$, $HfO(NO_3)_2$, $SiCl_4$, $(CH_3)_3SiCl$, $SiO_2$, $CH_3SiCl_3$, $SnCl_4$, SnO and $SnO_2$.

Examples of methylalumoxane are partially hydrolyzed trimethylaluminum types including compounds of the general stoichiometry $Al(CH_3)_2OH$ and $Al(CH_3)(OH)_2$.

In one embodiment of the present invention, step (b) is carried out in a solvent, for example an organic solvent or preferably water. Examples of organic solvents are methanol, ethanol, n-heptane, n-decane, decahydronaphthalene, cyclohexane, toluene, ethylbenzene, ortho-, meta- and para-xylene, dimethyl carbonate, diethyl carbonate, methyl ethyl carbonate, ethylene carbonate, propylene carbonate, diethyl ether, diisopropyl ether, di-n-butyl ether, methyl tert-butyl ether, 1,2-dimethoxyethane, 1,1-dimethoxyethane, 1,2-diethoxyethane, 1,1-diethoxyethane, tetrahydrofuran (THF), 1,4-dioxane, 1,3-dioxolane, N,N-dimethylformamide, N,N-dimethylacetamide and N-methylpyrrolidone (NMP), N-ethylpyrrolidone (NEP), acetone, methyl ethyl ketone, dimethyl sulfoxide (DMSO) and cyclohexanone.

In a preferred embodiment, step (b) is performed by slurrying said particulate electrode active material in an aqueous medium and contacting it with a compound of $M^1$ in said aqueous medium.

In embodiments wherein a solvent is applied it is preferred if the volume ratio of solvent to particulate electrode active material is in the range of from 9:1 to 1:50. In embodiments wherein water is applied as solvent it is preferred if the volume ratio of solvent to particulate electrode active material is in the range of from 5:1 to 1:50.

In one embodiment, it is preferred to apply 0.1 to 20% by weight of compound of $M^1$, referring to particulate electrode active material, more preferred are 10 to 20% by weight.

In order to achieve such a solvent- or water-based step (b), particulate electrode active material is slurried in an organic solvent or in water. Such slurrying may be effected at a temperature in the range of from 10 to 100° C., preferably 20 to 60° C.

A solution of compound of $M^1$ that is soluble in said organic solvent or water, respectively, in said organic solvent or preferably in water is then provided. Said solution is then contacted with the particulate electrode active material from step (a). Such contacting may be accomplished by adding particulate electrode active material to the solution of compound of $M^1$, or by adding solution of compound of $M^1$ to particulate electrode active material.

By such contact, compound of $M^1$ is allowed to interact with the particulate electrode active material. For example, compound of $M^1$ migrates into the pores of particulate electrode active material and is deposited on the surface as such or—preferably—with a release of counterion. It is advantages if counterions such as halide are removed as completely as possible.

Step (b) may have a duration in the range of from one minute to 10 hours, preferably two minutes to two hours, more preferably 5 minutes to one hour. It is preferred to slurry particulate electrode active material until a lump-free slurry has been obtained.

In one embodiment of the present invention, step (b) is carried out in the form of a chemical vapor decomposition reaction. This includes that particulate electrode active material is treated with evaporated compound of $M^1$ or with an aerogel of compound of $M^1$.

In yet another embodiment of the present invention, step (b) is carried out with little or without a solvent, and a particulate compound of $M^1$, for example an oxide, hydroxide or oxyhydroxide is mixed with compound according the general formula $Li_{1+x}TM_{1-x}O_2$, for example in a ploughshare mixer, in a tumble mixer, in a horizontal mixer, in a high speed mixer, in a high-shear mixer, in a conical mixer, in an Eirich mixer or in a free-fall mixer.

Dry mixing may be performed without a solvent or with very small amounts, for example a particulate compound of $M^1$ being diluted with 10 to 100 vol-% of solvent. The desired amount of compound of $M^1$, non-diluted or diluted, is then added to the respective particulate electrode active material, and both are mixed.

Mixing may be performed in a stirred vessel, in ploughshare mixers, paddle mixers and shovel mixers. Preferably, the inventive process is carried out in a shovel mixing tool, in a paddle mixing tool, in a Becker blade mixing tool and, most preferably, in a high-shear or in a high-speed mixer or in a ploughshare mixer. Preferred ploughshare mixers are installed horizontally, the term horizontal referring to the axis around which the mixing element rotates.

In a preferred embodiment, step (b) is carried out in a drum or pipe-shaped vessel that rotates around its horizontal axis. In a more preferred embodiment, step (b) is carried out in a rotating vessel that has baffles.

An optional step (c) includes removing compound of $M^1$ which is not deposited on said particulate electrode active material. Such optional step (c) may be performed filtering off the treated particulate electrode active material in embodiments that are solvent-based or water-based. together with the solvent—or water, if applicable, unreacted compound of $M^1$ is removed.

An additional optional step may include removal of the solvent, if any. Removal of said solvent may be accomplished by, for example, filtration, extractive washing, removal of solvent by distilling off said solvent, drying and evaporation. In a preferred embodiment, all or almost all solvent, for example 99% by weight or more, is removed by evaporation.

In embodiments of evaporative removal of solvent ("evaporation"), such an optional removal step may be performed at a temperature in the range of from zero to 300° C. In embodiments of filtration or extractive washing, such optional removal step may be performed at a temperature in the range of from zero to 100° C., preferably 15 to 90° C.

In embodiments wherein such optional removal step is performed as removal by distillation or evaporation of solvent, a pressure in the range of from 1 to 500 mbar may be applied. In embodiments of filtration or extractive washing, such optional removal step may be performed at ambient pressure as well.

Such removal—if applicable—is best performed between before step (d), especially immediately before step (d).

Step (d) includes performing a post-treatment by heating the material obtained after the step (b) or (c), if applicable, at a temperature from 250 to 950° C., preferably 300 to 800° C., more preferably from 405 to 800° C. and even more preferably from 450 to 750° C., in a fluidized bed. Said fluidized bed may be single-stage or multi-stage. Said fluidized bed may be a spouted bed.

The material of the fluidized bed reactor that in contact with at least partially coated particulate electrode active material in step (d) may be a metal, a metal alloy, a ceramic, a reinforced ceramic or a lining made from either of the foregoing. In one embodiment, alloys are selected from stainless steel and a nickel-based alloy. In another embodiment, the ceramic is an oxide ceramic, preferred are oxides of Al, Mg, Si, Zr, Y and mixtures thereof. In one embodiment, the ceramic is non-oxide ceramic, for example a carbide ceramic or nitride ceramic, for example SiC, $Si_3N_4$, or tungsten carbide, WC. In one embodiment, the reinforced ceramic is a ceramic matrix composite, preferred are alumina fiber reinforced alumina and silicon carbide fiber reinforced silicon carbide. In one embodiment, the lining is alumina ceramic tile lining. In one embodiment, the lining is a tungsten carbide coating. In other embodiments, the kiln material is selected from alumized alloys, titanized alloys, and pure nickel.

In one embodiment, the fluidized bed reactor has knockers. By use of knockers, particulate electrode active material is prevented from adhering to the tube wall and is kept flowable.

A multi-stage fluidized bed reactor in the context of the present invention includes a reactor or a combination of reactors in which in the steady state at least two, preferably at least three, most preferably in the range of from 3 to 20 stages of a fluidized bed exist. Said stages may also be termed as zones. The stages may be arranged horizontally or vertically, preferred is horizontally. Different stages are separated from each other through physical provisions, especially through at least one structural measure. An example of structural measures in case of a horizontally staged fluidized bed reactor are weirs. An example of structural measures in the case of a vertically staged fluidized bed reactor are perforated plates, perforated boards, and bubble trays (German: Glockenböden).

In one embodiment of the present invention, said multi-stage fluidized bed reactor is selected from horizontal multi-stage fluidized bed reactors wherein the stages are separated from each other by weirs. Preferred are overflow weirs or weirs with specific passage openings, or different combinations of weirs with different geometry and arrangement of the cross-sectional open area for vertical particle transport. The fluidized particles can pass these physical provisions at defined areas, depending on the applied type of weirs. In case of overflow weirs, solid particles can pass to the next stage, when the level of the particles in one stage exceeds the height of the weir. The overall direction of particle movement can be adjusted by design of the fluidized bed gas distributor, allowing tuning of the residence time of the particles in each stage of the horizontal multi-stage fluidized bed reactor as well as the overall residence time.

In a horizontal multi-stage spouted bed reactor, at least one to all of the stages are designed for spouted bed operation. The individual stages in the horizontal multi-stage spouted bed reactor in this case are prismatic.

In one embodiment of the present invention, said multi-stage fluidized bed reactor is selected from vertical multi-stage fluidized bed reactors wherein the stages are connected with each other through standpipes. Solid particles can pass the physical provisions that separate the different stages of the fluidized bed from each other, from a higher stage to the stage below. If the level of the fluidized bed on a stage of the multi-stage fluidized bed reactor is exceeding the height of the standpipe due to a solids feed to this level, the fluidized solids may drop into the respective standpipe as long as the level of the respective stage of fluidized bed exceeds the height of the respective standpipe and are thereby transferred to the stage below. In order to avoid short-circuits of a stage, the point where the standpipe of the stage above enters the separate stage of the multi-stage fluidized bed reactor and the point, where the standpipe to stage below is located, should be on opposing sides of the separate stage of the multi-stage fluidized bed reactor.

In one embodiment of the present invention, step (d) has a duration in the range of from 10 minutes to 180 minutes, preferably 20 to 150 minutes and even more preferably 20 to 90 minutes.

Preferably, in embodiments wherein step (d) is carried out in a vertical multi-stage fluidized bed reactor, the heat in step (d) is introduced at least partially through heating of the wall(s) or other elements of the reactor in which step (d) is being employed.

In one embodiment of the present invention, wherein step (d) is carried out in a vertical multistage fluidized bed reactor, the gas outlet temperature in step (d) is ambient temperature. In other embodiments, the gas outlet temperature in step (d) is in the range of from 50 to 100° C.

The gas inlet may have a superficial gas velocity in the range of from 5 to 50 cm/s, preferably 20 to 30 cm/s. Said velocity is measured in the fluidized bed and relates to the empty reactor. The average residence time of the gas may be in the range of from less than one second to one minute per stage.

In a preferred embodiment, the superficial gas velocity in the fluidized bed changes with every stage due to the different temperatures of the stages in step (d). The volumetric gas flow rate and the reactor diameter are then selected in a way that the superficial gas velocity is neither below the minimum fluidization velocity nor above the terminal velocity (German: Einzel-Partikel-Austragsgeschwindigkeit). Accordingly, a stable fluidization may be achieved.

When the gas leaves the multi-stage fluidized bed reactor, solids may be removed from the gas stream, for example by means of a cyclone or by filter candles.

In one embodiment of the present invention the heat in step (d) is at least partially transferred by thermal radiation, especially at temperatures of 500° C. or higher. Said thermal radiation partially occurs through heating through a heating system that may be installed in or close to the wall of the multi-stage bed reactor or between the free space between 2 stages. Said thermal radiation may partially occur through heat exchange among the fluidized particles. The higher the temperature the higher the percentage of heat exchange through thermal radiation.

In one embodiment of the present invention, step (d) is being performed in a multi-stage fluidized bed within the range of from 3 to 20 stages.

In one embodiment of the present invention, the apparatus wherein step (d) is being performed has a surface made from ceramic material. This refers preferably to the surface that comes into contact with the material obtained according to step (c), if applicable, or (b). A surface made from ceramic—or ceramic material—refers to surfaces but not necessarily to the whole wall. It is therefore possible that the wall of said apparatus is from steel coated with a ceramic material. Said surface may also include some or all of the parts that constitute the different stages.

In one embodiment of the present invention step (d) is carried out in an atmosphere with a concentration of oxygen of at least 20% by vol., for example in air or in mixtures of oxygen and air, for example air:oxygen of 1:1 by volume or an 80% by volume or 99% by volume oxygen. Step (d) may be carried out under pure oxygen atmosphere as well.

After having performed step (d), the coated electrode active material may be cooled down to ambient temperature. This is the case especially in embodiments wherein a single stage fluidized bed is used.

In one embodiment of the present invention said cooling is carried out in a cooled rotary tube. In one embodiment of the present invention the cooling tube is cooled by water. In one embodiment f the present invention the outer surface of the cooling rotary tube is continuously washed over with water.

In one embodiment of the present invention the outer surface of the rotary tube for cooling is continuously air cooled by means of forced convection, by removal of air with a blower, or with a fan machine. The outer surface of said rotary tube for cooling may be cooled by way of a fan machine or blower as well.

In one embodiment of the present invention the outer surface of the cooling rotary tube is continuously air cooled by means of forced convection.

After cooling, the material may optionally be milled in an air classifier mill. Before or after optional milling, the material may optionally be classified using a screen. The material may furthermore me processed in a magnetic separator, freeing the powder from magnetic impurities.

Coated electrode active material obtained according to the inventive process shows excellent electrochemical behavior, for example reduction in impedance growth, gassing, rate capability and cycle life. It shows a very low tendency to agglomeration of secondary particles.

The invention claimed is:

1. A process for making a coated electrode active material wherein the process comprises the following steps:
   (a) providing a particulate electrode active material according to general formula $Li_{1+x}TM_{1-x}O_2$, wherein TM comprises Ni, Co, and, optionally, Mn, and, optionally, at least one metal chosen from Mg, Al, Ba, W, Ti and Zr; wherein x ranges from zero to 0.2, and wherein at least 15 mole-% of transition metal in TM is Ni,
   (b) treating the electrode active material with a compound comprising $M^1$, wherein $M^1$ is chosen from Li, Al, B, Mg, Si, Sn, a transition metal, and combinations thereof, wherein the compound comprising $M^1$ does not act as a cathode active material on its own,
   (c) optionally, removing the compound comprising $M^1$ which is not deposited on the particulate electrode active material, and
   (d) performing a post-treatment by heating the material obtained after the step (b) or step (c), if applicable, at a temperature ranging from 250° C. to 950° C. in a multi-stage fluidized bed with a superficial gas velocity neither below the minimum fluidization velocity nor above the terminal velocity;
   wherein step (d) is carried out in an atmosphere with a concentration of oxygen of at least 50% by volume.

2. The process according to claim 1, wherein the treatment according to step (b) is chosen from coating, deposition, and impregnation.

3. The process according to claim 1, wherein TM is a combination of transition metals according to general formula (I)

$$(Ni_aCo_bMn_c)_{1-d}M_d \qquad (I)$$

wherein
a ranges from 0.6 to 0.95,
b ranges from 0.025 to 0.2,
c ranges from 0.025 to 0.2, and
d ranges from zero to 0.2;
M is chosen from Mg, Al, Ba, W, Ti, Zr, and combinations thereof; and
a+b+c=1.

4. The process according to claim 1, wherein step (b) is performed without use of a solvent in a mixer, in a ploughshare mixer, in a tumble mixer, in a horizontal mixer, in a conical mixer, in an Eirich mixer, or in a free-fall mixer.

5. The process according to claim 1, wherein $M^1$ is chosen from Al, Ti, B, Mg, Co, Y, Ta, Zr, and combinations thereof.

6. The process according to claim 1, wherein step (b) is performed by slurrying the particulate electrode active material in an aqueous medium and contacting the particulate electrode active material with the compound comprising $M^1$ in the aqueous medium.

7. The process according to claim 1, wherein step (d) has a duration ranging from 10 minutes to 180 minutes.

8. The process according to claim 1, wherein between steps (b) and (d), any solvent used in step (b) is removed at a temperature ranging from 0° C. to 300° C.

9. The process according to claim 1, wherein step (d) is carried out in an atmosphere with a concentration of oxygen of at least 80% by volume.

* * * * *